United States Patent [19]

McDaniel et al.

[11] 4,442,274

[45] Apr. 10, 1984

[54] POLYMERIZATION PROCESS USING A PHOSPHATE CONTAINING SUPPORT FOR VANADIUM CATALYST

[75] Inventors: Max P. McDaniel; Marvin M. Johnson, both of Bartlesville, Okla.

[73] Assignee: Phillips Petroleum Company, Bartlesville, Okla.

[21] Appl. No.: 423,597

[22] Filed: Sep. 27, 1982

Related U.S. Application Data

[62] Division of Ser. No. 221,752, Dec. 31, 1980, Pat. No. 4,397,761.

[51] Int. Cl.³ .............................. C08F 4/02; C08F 4/68
[52] U.S. Cl. ...................................... 526/95; 502/154; 526/129; 526/156; 526/352
[58] Field of Search ........................... 526/95, 129, 156

[56] References Cited

U.S. PATENT DOCUMENTS

| | | | |
|---|---|---|---|
| 2,938,001 | 5/1960 | Rosset | 252/432 |
| 3,018,255 | 1/1962 | Banks | 252/455 R |
| 3,271,299 | 9/1966 | Kearby | 208/114 |
| 3,320,331 | 5/1967 | Gaspar et al. | 585/658 |
| 3,351,623 | 12/1964 | Walker et al. | 526/97 |
| 3,371,079 | 2/1968 | Peters et al. | 526/95 |
| 3,904,550 | 9/1975 | Pine | 252/437 |

FOREIGN PATENT DOCUMENTS

949011 2/1964 United Kingdom .

*Primary Examiner*—Stanford M. Levin

[57] ABSTRACT

A supported vanadium catalyst comprising a vanadium compound on a phosphate-containing base. This catalyst in conjunction with an organoaluminum cocatalyst is capable of giving good activity and producing a polymer having broad molecular weight distribution. The catalyst system is sufficiently sensitive to hydrogen to allow broad leeway in controlling the molecular weight of the resulting polymers.

36 Claims, No Drawings

POLYMERIZATION PROCESS USING A PHOSPHATE CONTAINING SUPPORT FOR VANADIUM CATALYST

CROSS REFERENCE TO RELATED APPLICATION

This is a divisional of copending application Ser. No. 221,752, filed Dec. 31, 1980, U.S. Pat. No. 4,397,761.

BACKGROUND OF THE INVENTION

This invention relates to vanadium catalysts for olefin polymerization supported on a phosphate containing base.

Vanadium compounds display catalytic activity in a number of diverse chemical reactions. Since vanadium is closely related to both chromium and titanium in the Periodic Table, it is only natural that it has been tried in place of chromium or titanium as a catalyst for the polymerization of mono-1-olefins, such as ethylene. Peters et al, U.S. Pat. No. 3,371,079 discloses silica supported vanadium pentoxide with a cocatalyst for polymerizing ethylene. Kerby, U.S. Pat. No. 3,271,199 discloses aluminum phosphate supported vanadium pentoxide as a hydrogenation catalyst and suggests aluminum phosphate as a support for chromium or molybdenum for polymerizing ethylene and propylene. However, vanadium catalysts have not been as commercially successful as titanium or chromium catalysts for olefin polymerization. Supported vanadium catalysts have been particularly disappointing as olefin polymerization catalysts. To a substantial extent, the greatest success with vanadium in the prior art as an olefin polymerization catalyst has been in systems more analogous to unsupported titanium systems, i.e., $VOCl_3$, $VCl_4$ or $VCl_3$ used with a reducing agent such as an aluminum hydride. However, the natural tendency of vanadium to catalyze reactions other than polymerization has been a constant problem limiting its usefulness in olefin polymerization.

It would be desirable for some applications to produce polymer having different characteristics from that produced with the chromium systems, such as for instance, polymer with a lower vinyl content and/or a broader molecular weight distribution. Also, it would be desirable to be able to obtain in nontitanium systems the molecular weight sensitivity to hydrogen displayed by titanium catalyst systems.

SUMMARY OF THE INVENTION

It is an object of this invention to provide a supported catalyst capable of giving polymers with broad molecular weight distribution;

It is a further object of this invention to provide a supported catalyst capable of giving polymer with low vinyl content; and It is yet a further object of this invention to provide a single supported catalyst system capable of giving a broad spectrum of polymers so far as melt flow is concerned.

In accordance with this invention, a vanadium compound on a phosphate-containing support is utilized in conjunction with an organoaluminum cocatalyst.

DESCRIPTION OF THE PREFERRED EMBODIMENTS

The support can be formed in a number of ways. Four suitable methods of preparing the support are set out hereinbelow under the headings Method A, Method B, Method C and Method D.

Method A. The support of Method A is at least predominantly amorphous aluminum orthophosphate. In accordance with Method A, the phosphate-containing support can be formed using three separate techniques. First, conventional techniques as disclosed in Hill et al, U.S. Pat. No. 4,219,444, the disclosure of which is hereby incorporated by reference can be used. In this technique an aluminum salt is combined with a source of phosphate ions in an aqueous medium and neutralized with a base to give a hydrogel. Alternatively, a polar organic solvent can be used. The second technique for forming the base of Method A is to combine an aluminum alkoxide such as aluminum ethoxide with phosphoric acid to give a hydrogel directly, as disclosed in Pine, U.S. Pat. No. 3,904,550, the disclosure of which is hereby incorporated by reference.

In accordance with the third technique of Method A, an aluminum phosphate gel is formed from a concentrated mass of reactants comprising aluminum ions from an aluminum salt and a source of orthophosphate ions. This is done by using an aluminum salt which will melt, preferably one which will melt at or below the boiling point of water or by forming a syrup of a water soluble aluminum salt and a very small amount of water.

Generally, hydrated aluminum salts such as hydrated aluminum nitrate are most susceptible to being melted and thus are preferred as the source of aluminum ions for the melt method. Aluminum bromide and hydrated aluminum bromate can also be used as can, broadly, any aluminum salt which will melt. If desired up to 20 weight percent additional water can be present based on the weight of the aluminum salt or there can be no water except the water, if any, from the water of hydration and the water, if any, from the base used in the subsequent neutralization, i.e., no extraneous water is added. By additional water is meant water actually added as water and does not count the water, if any, from the water of hydration of the ingredients and/or the water from the base, if any. There may be some advantage to adding 1 to 15 weight percent water based on the weight of the aluminum salt, however. The percentages of water are based on the actual weight of the aluminum salt including any water of hydration.

Alternatively, an aluminum salt which will not necessarily melt but which will dissolve enough to form a syrup in 40 weight percent, or less, water based on the weight of the aluminum salt can be used. Generally, 5 to 20 weight percent water is used based on the weight of the aluminum salt when a syrup is formed. Aluminum sulfate, for instance is ideally suited for use in this embodiment of the invention.

The source of the phosphate ions can be any source of orthophosphate ions and is generally orthophosphoric acid or orthophosphates, such as monobasic ammonium phosphate or dibasic ammonium phosphate or mixtures thereof.

The temperature, if a melt is used, can be any temperature at or above which the aluminum salt chosen will melt. The reaction can be carried out in any atmosphere including air or can be carried out under an inert atmosphere for instance. Generally, temperatures of 65°–200° C., preferably 65°–100° C. are used. Although, since the preferred aluminum salt is $Al(NO_3)_3.9H_2O$ which melts at 73° C., the most preferred temperatures based on the use of this aluminum salt is about 80°

C.±5° C. If a very concentrated syrup of a water soluble aluminum salt and water are used, any temperature up to the boiling point of the syrup under the conditions employed can be used, preferably 20°–150° C.

One of the advantages of this technique is that, since very little water, if any, is present during the formation of the aluminum phosphate, it is not necessary to utilize azeotropic distillation or washing with a normally liquid water miscible organic solvent to remove the water gently. The most important advantage, however, is that the concentrated mass gives a gel with greater physical strength.

Low pore volume hydrogels usually give the highest porosity xerogels after drying because they have superior internal strength to withstand the compression of surface tension. Thus, if the hydrogel occupies 6 cc per gram of aluminum phosphate or less, generally 3 to 6 cc per gram, it will give a xerogel having improved porosity for a catalyst base than will a hydrogel conventionally prepared from a dilute aqueous solution which will occupy about 11 cc per gram or more. By 6 cc per gram, for instance is meant that each gram of any aluminum phosphate occupied 6 cc in the hydrogel stage. Thus, another way to define the phosphate of the third technique is that the aluminum salt melt/phosphate mass or aluminum syrup/phosphate mass is sufficiently concentrated so as to give a hydrogel which occupies 3 to 6 cc per gram. The theoretical minimum if no extraneous water is added is about 3 cc per gram with aluminum nitrate.

It is frequently preferred that a small amount of a boron compound such as $B(OH)_3$ be introduced into the melt to be coprecipitated with the aluminum phosphate. Other suitable boron compounds include borates such as ammonium borate. By coprecipitated as it relates to the boron compound, it is meant that the aluminum phosphate is formed into a true hydrogel in the presence of the boron compound. It is not known to what extent the borate becomes incorporated into the hydrogel structure. The amount of boron compound present when the aluminum phosphate is gelled can vary widely but it is generally used in an amount so as to give about 1 to 30 mole percent boron based on the moles of phosphorus.

The neutralization in the first and third techniques of Method A can be carried out either by adding the acid phase (aluminum salt/phosphate source mixture) to the base phase or vice versa. The neutralizing agent can simply be added to the acid phase with stirring. Another suitable practice is to drip the acid phase into the base phase. This results in the production of small spheres or balls of the orthophosphate, particularly with the third technique where the melt of aluminum salt and source of phosphate ions is dripped or sprayed or otherwise alowly added to a large excess of ammonium hydroxide. The spheres are subsequently collected, washed, dried and calcined. It is generally desirable that gellation not occur at a pH of about 4. If gellation is forced by combination of the acid and basic phases until the gel forms, it is generally preferred that the pH be at least 5, more generally at least 6 during the gel formation. Generally, the pH when the gellation occurs in this manner will be 5 to 10, preferably 6 to 10. Since gellation will occur at a pH of about 4 which is reached by adding about 72 percent of the theoretical amount of neutralizing agent needed for complete neutralization, e.g. to reach a pH of 7, gellation can best be forced by combining slowly with stirring about 72 percent of the neutralizing agent and then quickly adding the rest. Alternatively, 60 to 70 percent can be added and the resulting composition allowed to set until gellation occurs spontaneously after a matter of about 1 minute to 48 hours, more generally 5 minutes to 10 hours. This will be at a pH below 5, generally about 2. While any base can be used, concentrated ammonium hydroxide, ammonia gas or ammonia dissolved in an alcohol or other non-aqueous solvent are preferred basic materials. Also ammonium carbonate alone or in combination or ethylene oxide or propylene oxide can be used as the neutralizing agent.

The aluminum and phosphorus components are selected so as to give an atom ratio of phosphorus to aluminum within the range of 0.2:1 to 1.8:1, preferably 0.6:1 to 1:1. While low phosphorus compositions can be visualized for convenience as a mixture of alumina and aluminum phosphate of varying proportions, they are in fact not a mixture.

Method B. The support of Method B is a phosphated silica-containing material generally composed of 80 to 100 weight percent silica, the remainder, if any, being selected from alumina, boria, magnesia, thoria, titania, zirconia, or mixtures thereof. For instance, the silica-containing material can consist essentially of silica and no more than 0.2 weight percent of alumina or other metal oxide. Other ingredients which do not adversely affect the catalyst or which are present to produce some unrelated result can also be present. The silica can be a large pore material prepared as described in U.S. Pat. No. 3,887,494 which issued June 3, 1975 to Dietz covering the preparation of silica-titania cogels or U.S. Pat. No. 3,900,457 which issued Aug. 19, 1975 to Witt covering the preparation of a synthetic silica, the disclosures of which are hereby incorporated by reference. These types of silicas are known in the art to inherently give higher melt flow polymer with chromium catalysts. However, one of the advantages of the use of the support of Method B is that the silica base which is to be phosphated does not have to be a large pore silica. Thus, in accordance with one of the preferred embodiments of this invention, less expensive silicas made by simple tray drying, oven drying or spray drying can be used. These silicas are easier and less expensive to produce and are inherently more durable.

The treatment to produce the phosphated silica support is preferably carried out simply by forming a slurry of the silica xerogel and a source of phosphate ions, such as orthophosphoric acid by either adding the acid to the support or the support to the acid. Alternatively, an orthophosphate can be utilized. The preferred phosphate is a monoammonium phosphate although diammonium phosphate or metal phosphates or any phosphorus compound convertible to a phosphate can be utilized as the phosphating agent. Any reasonable temperature and atmosphere can be utilized for the incorporation of the phosphorus into the silica with room temperature in air being entirely satisfactory. Alternatively, a phosphorus compound such as $POCl_3$ (phosphoryl chloride or $PCl_3$, phosphorus trichloride) can be vaporized and the vapor contacted with the silica. These materials will react with the surface OH groups and give off HCl. This vapor treatment can be carried out at the vaporization temperature of the phosphorus compound up to about 400° C.

The term "phosphated" is meant to describe the silica treated with a phosphorus compound as described herein and not necessarily to mean that phosphate groups are attached to the silica although there probably is a reaction with the silica when the catalyst is activated.

Alternatively, the phosphating agent can be added to the silica at the hydrogel stage of the silica. Preferably, this is done by adding the phosphating agent such as phosphoric acid to the organic liquid used to remove water.

The phosphorus component is added in an amount to give 0.001 to 0.2, preferably 0.01 to 0.1 gram atoms of phosphorus per mole of silica. Most preferably about 1 to 5 mole percent is used which would be about 1 to 5 atoms of phosphorus per atom of vanadium particularly when the preferred 1 weight percent vanadium based on the weight of the phosphated support is used. Generally, the ratio of atoms of phosphorus per atom of vanadium will be in the range of 0.1 to 20, preferably 1 to 10. Based on surface area, the phosphorus compound is preferably present in an amount sufficient to give about 0.005 to 1, preferably about 0.01 to 0.5 mg P/m$^2$ of silica surface as measured by BET nitrogen sorption.

Method C. The support of Method C is a silica/aluminum phosphate combination and is the least preferred of the four types of supports. The silica/aluminum phosphate combination of Method C can be made in four separate techniques. First, the two can be coprecipitated as is known in the art, for instance as shown in Kirby, U.S. Pat. No. 3,342,750 (Sept. 19, 1967), the disclosure of which is hereby incorporated by reference. In accordance with this technique, a silicate is combined with a source of aluminum ions and a source of phosphate ions and neutralized to form a hydrogel cogel. The silicate is preferably a tetrahydrocarbyl orthosilicate, such as ethyl silicate, although sodium silicate can also be used. The aluminum component is preferably aluminum nitrate although aluminum chloride or other aluminum salts can be used. The source of phosphate ions is preferably orthophosphoric acid although monobasic dihydrogen ammonium phosphate, and dibasic hydrogen ammonium phosphate, for instance, can also be used. This reaction is generally carried out in an aqueous medium although a polar organic solvent can be used. It is frequently preferred that a small amount of a boron compound such as boric acid be introduced into the reaction mixture to be coprecipitated with the aluminum phosphate and silica. Other suitable boron compounds include borates such as ammonium borate. By coprecipitated as it relates to the boron compound, it is meant that the silica/aluminum phosphate is formed into a hydrogel in the presence of the boron compound. It is not known to what extends the borate becomes incorporated into the hydrogel structure. The amount of boron compound present when the silica/aluminum phosphate cogel is formed can vary widely but it is generally used in an amount so as to give 0.5 to 15 mole percent boron based on the moles of phosphorus.

While any base can be used, concentrated ammonium hydroxide, ammonia gas, or ammonia dissolved in an alcohol or other non-aqueous solvents are preferred basic materials. Also ammonium carbonate can be used.

The neutralization can be carried out either by adding the acid phase (silicate/aluminum salt/phosphate source mixture) to the base phase or vice versa. One suitable practice is to drip or spray or otherwise slowly add the acid phase into the base phase. The same pH considerations apply as apply in the first and third techniques of Method A.

It may be desirable in some instances to coprecipitate other materials such as titania with the silica/phosphate cogel or have other materials present during the gellation.

In accordance with the second technique of Method C, the silica/aluminum phosphate combination is made by impregnating a silica hydrogel or xerogel with aluminum phosphate. This is carried out by combining the source of aluminum ions and phosphate ions with a slurry of silica hydrogel or xerogel and then evaporating the solvent whereupon the aluminum orthophosphate forms. To a substantial extent, it is believed the aluminum orthophosphate forms within the pores of the silica. Alternatively, the source of aluminum and phosphate ions can be adsorbed into the dry silica. This is largely a physical impregnation and entrapment of the phosphorus component in the pores of the silica. When a silica xerogel is used, instead of evaporating to dryness the evaporation can stop when the liquid in excess of one pore volume is gone but some liquid remains in the pores and a gel is formed by neutralization, or an amount of liquid less than one pore volume can be added initially, and the gel formed by neutralization. The scope of the silica can be the same as in Method B.

As to the scope of the aluminum and phosphorus components, the base when used, and the solvent, is the same as that set out hereinabove with regard to the first technique of Method C. One difference in scope between these two techniques is that in this technique a boron compound such as ammonium borate or boric acid can be substituted for the aluminum salt so as to form what is believed to be boron phosphate onto the silica on evaporating the solvent.

In accordance with the third technique of forming the silica/aluminum phosphate base in accordance with Method C, aluminum orthophosphate is precipitated (gelled) in the presence of a silica hydrogel or xerogel. This results in forming the silica as a dispersed phase in an aluminum orthophosphate matrix as opposed to having the aluminum orthophosphate impregnated into the pores of the silica. In accordance with this technique, a source of aluminum and phosphate ions is combined with a silica hydrogel or xerogel and the aluminum phosphate formed by combining with a neutralizing agent. The scope of the ingredients is the same as in the first technique of Method C hereinabove except monobasic ammonium phosphate in the preferred source of phosphate ions. As with the first technique of Method C, a boron compound can be present during the precipitation of the aluminum orthophosphate. Also, the same pH considerations apply as in the first and third techniques of Method A.

In accordance with the fourth technique of Method C for making the silica/aluminum phosphate composition, a silica xerogel and an aluminum phosphate xerogel are simply physically mixed. The scope of the ingredients for making the separate silica and aluminum phosphate are the same as those used in the first technique of Method C for making the cogel. More broadly, any known method of making silica suitable for use as a base in olefin polymerization catalysts and any known methods of making aluminum phosphate having relatively high surface area can be used for producing the silica and aluminum phosphate, respectively. In addition, the aluminum phosphate can be made by forming a melt of an easily melted aluminum salt such as hydrated aluminum nitrate, adding a source of phosphate ions and neutralizing as described in Method A, technique three.

The resulting silica and aluminum phosphate xerogels can simply be ground together or blended in a conventional dry blender or mixed in a slurry with a nonreactive diluent such as a hydrocarbon.

One way of achieving this mixture is to charge the silica and aluminum phosphate in powder form to the activator with the fluidization normally employed during the activation serving to effect the mixing. Alternatively, the silica and aluminum phosphate can be separately activated and thereafter the two combined.

The aluminum and phosphorus components in Method C are selected so as to give an atom ratio of phosphorus to aluminum within the range of 0.2:1 to 1:1, preferably 0.6:1 to 0.9:1. Further with respect to the relative proportions, in all techniques except technique two, the silica and phosphate will generally be used in molar ratios of 10:1 to 1:20 moles of silica per mole of phosphate (or gram atoms of phosphorus), preferably 2:1 to 1:2 moles per mole or gram atom. In technique two, the phosphate will generally be used in an amount within the range of 1 to 50, preferably 5 to 25 mole percent based on the moles of silica.

Method D. In accordance with Method D for preparing the phosphate-containing base, alumina is phosphated in a manner analogous to the phosphating of silica in Method B although with the silica there is probably no reaction until activation whereas the phosphating agent does react with the alumina. As with the silica, the alumina can be phosphated either by adding the phosphating agent to the hydrogel or adding the phosphating agent to the xerogel. The same scope of phosphating agents applicable to phosphating the silica are applicable to phosphating the alumina. In addition to phosphating pure alumina, it is also within the scope of this method of producing the phosphate-containing base to utilize an aluminum phosphate described in Method A having a low (less than about 0.6, generally less than 0.4) phosphorus to aluminum ratio and treating it with the phosphating agent to impart additional phosphate to the surface. The alumina can contain minor amounts of other ingredients which do not affect the quality of the final catalyst but is generally essentially pure alumina or low phosphorus aluminum phosphate.

In all of the embodiments, whenever a gel is formed, it is generally washed with water to wash out extraneous ions.

As with the silica, if an alumina hydrogen is phosphated, the phosphoric acid is preferably incorporated in the organic water-miscible liquid used to wash the hydrogel or to remove the water by azeotropic distillation. More specifically, the hydrogel may be washed with water, then washed with an organic liquid such as isoamyl alcohol containing phosphoric acid, then filtered and the solvent allowed to evaporate. When the gel is washed a number of times, the phosphating agent is normally only in the last wash. When azeotropic distillation is used, it is in the organic liquid initially.

Whether the starting material is alumina or a low phosphorus aluminum phosphate, Method D takes advantage of the fact that some properties, such as surface area, are favored by high alumina whereas others, such as melt index potential, are favored by high phosphate. By imparting a phosphate layer on the surface of alumina or low phosphorus aluminum phosphate, it is possible to take advantage of both trends.

The phosphating agent is preferably used in an amount to react with the alumina surface and give a P/Al ratio of this reaction product on the surface of 0.2:1 to 1.8:1, preferably 0.6:1 to 1:1. In practice, however, it is possible to use as much phosphating agent as desired with the excess simply being washed off after the phosphating treatment is complete. The phosphating treatment is generally carried out at a temperature of 15° C. to 500° C., preferably room temperature to the boiling point of the solvent if a phosphate solution is used or 500° C. if a vapor is used and a time of 1 minute to 2 hours, preferably 2 minutes to 30 minutes.

In any of the four methods set out hereinabove, wherein a hydrogel is formed, it is greatly preferred that the water be removed to convert the hydrogel to a xerogel by means of azeotropic distillation or washing with a water miscible liquid. Any such water miscible liquid effective in aiding in removing water can be utilized. Generally, such liquids are relatively volatile, oxygen-containing organic compounds having relatively low surface tension. Exemplary classes of such compounds are alcohols, ketones, and esters. Particularly suitable are alcohols, such as isoamyl alcohol and esters, such as ethyl acetate.

As to Method A, it is readily apparent that the hydrogel resulting from technique 1 utilizing an aqueous solution of the aluminum component, the phosphorus component, and an aqueous solution of the base results in free water in the hydrogel. In technique 2 of Method A, there could be some water from the water in the phosphoric acid although there is no water from a base since a base is not required and hence this is essentially an anhydrous preparation. In technique 3 of Method A, there is essentially no free water in the resulting gel so that the resulting gel inherently has the good characteristics associated with the hydrogels made in non-aqueous systems. However, there may be some water carried over from water of hydration of the aluminum component and/or from the base and also it may be desirable in some instances in technique 3 of Method A to wash the resulting gel with water in which case azeotropic distillation to remove the water is desirable.

In Method C, techniques 1 and 3, carried out utilizing aqueous solutions of the ingredients involve the formation of hydrogel having excess free water and thus create the situations where azeotropic distillation or washing with a water miscible solvent is highly desirable.

The vanadium can be combined with the support by coprecipitating a vanadium compound with the phosphate-containing support, by adding a vanadium compound to the support at the hydrogel stage, or by adding a vanadium compound anhydrously to the xerogel. Suitable vanadium compounds include ammonium vanadate, vanadyl sulfate, vanadium tribromide, vanadium di or trichloride, vanadium tri or pentafluoride, vanadyl dibromide and vanadyl tribromide, vanadyl trichloride or other water soluble vanadium compounds. Vanadium acetylacetonate and other hydrocarbon soluble vanadium compounds can be used to impregnate the xerogel.

The vanadium compound is used in an amount so as to provide from 0.001 to 10, preferably 0.1 to 5, more preferably about 1 weight percent vanadium based on the weight of the activated support.

After the vanadium compound has been incorporated into the support and the hydrogel converted to a xerogel by removing free water, the support is activated.

The activation of the xerogel can be carried out at temperatures known in the art although the phosphate-containing base of this invention can be activated at slightly lower temperatures, for instance temperatures of 150°–800° C., preferably 200°–500° C., compared with the 450°–1000° C. temperature generally employed for chromium supported on pure silica bases. In many instances, it is actually preferred to utilize the lower end of the temperature range, i.e., from about 200°–340° C. With technique 4 of Method C, if the silica and aluminum phosphate are to be combined after activation, a slightly higher activation temperature for the silica, i.e., 300°–800° C. can be used for it. Suitable activation times are from 1 minute to 48 hours, preferably 0.5 to 10 hours.

The activating ambient can be either an inert, reducing or oxidizing ambient but for convenience and economy, an oxygen-containing ambient such as air is generally preferred. As the data hereinafter show, however, good results can be obtained with carbon monoxide.

The support can be activated before or after addition of the vanadium compound or both.

The catalyst system of this invention comprises vanadium supported on a phosphate-containing base which is used in conjunction with an organoaluminum cocatalyst, preferably one having the formula $R_nAlX_{3-n}$ wherein n is a number between 1 and 3 inclusive and R is a hydrocarbyl group having 1 to 12, preferably 2 to 5 carbon atoms per group, and X is a halogen, preferably chlorine. Chlorine-containing compounds are preferred, i.e., those where n is 1 or 2, and X is chlorine. However, trialkylaluminum compounds such as triethylaluminum are also satisfactory. The most preferred are diethylaluminum chloride, ethylaluminum dichloride, and ethylaluminum sesquichloride.

The cocatalyst is utilized in an amount so as to give an atom ratio of aluminum (from the cocatalyst) to vanadium within the range of 0.5:1 to 150:1, preferably 2:1 to 75:1. Based on the solvent if any in the polymerization zone, the amount of metal compound cocatalyst is generally within the range of 10 to 500, preferably 50 to 250 parts by weight per million parts by weight of the solvent, these amounts being based on the total reactor contents in instances where no solvent is utilized. The cocatalyst can either be premixed with the catalyst or added as a separate stream to the polymerization zone, the latter being preferred, or a combination of both methods.

In addition, the catalyst can be pretreated with an organometal cocatalyst if desired.

The catalysts of this invention can be used to polymerize at least one mono-1-olefin containing 2 to 8 carbon atoms per molecule. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment in contact and processes. Contacting of the monomer or monomers with the catalyst can be effected by any manner known in the art of solid catalyst. One convenient method is to suspend the catalyst in an organic medium and to agitate the mixture to maintain the catalyst in suspension throughout the polymerization process.

The catalyst of this invention is particularly suitable for use in slurry polymerization systems to produce relatively high melt flow polymer. Everything from blow molding grade resins which may require a melt index of as little as 0.1 or less to paper coating and injection molding grade resins which may require a melt flow of 20 or greater can be produced from a single catalyst system simply by the use of a molecular weight control agent, such as hydrogen. The catalyst of this invention displays a high sensitivity to hydrogen so that by controlling the amount of hydrogen utilized, polymers having a very high molecular weight as indicated by low melt flow, through polymers having a very low molecular weight as indicated by high melt flow can be obtained. Further control of melt flow can be obtained by the small amount of leeway in temperature control and by the known effect of higher catalyst activation temperature causing the melt flow of the resulting polymer to be higher. However, yet a further advantage of this invention is that a single activation temperature for the catalyst and a single polymerization temperature can be utilized and still obtain a broad spectrum of polymers utilizing a single catalyst. By spectrum of polymers is meant that a particular catalyst in one run can be used to give low melt flow polymer and then an identical catalyst in another run can be used to give high melt flow polymer or anything in between by control of variables such as hydrogen concentration.

With slurry polymerization of ethylene and predominantly ethylene copolymer systems, the feasible temperature range is generally about 200°–230° F. (93°–110° C.) and the commercial systems are generally run as close to the maximum as possible, i.e., 225° F.±5° F. (107° C.±3° C.) in order to get the highest possible melt index. The catalyst of this invention allows running at the low end of this temperature range, i.e., 205° F.±5° F. (96° C.±3° C.) in systems normally employing 225° F. (107° C.). The lower temperature gives a relatively higher monomer partial pressure, thus giving higher activity.

Catalysts of this invention have the further advantage of not having any measurable induction time between initial contact with the monomer and the initiation of polymerization.

When hydrogen is used in this invention, it can be used at partial pressures up to 120 psia (0.8 MPa), preferably within the range of 20 to 70 psia (0.1 to 0.48 MPa).

If the object is to produce a copolymer, 0.5 to 20 mole percent or more comonomer can be used, although enough to give 0.4 to 3 weight percent incorporation is preferred. As used herein, the term "at least predominantly ethylene" means an essentially pure ethylene monomer feed or a feed containing ethylene as the principal monomer with 0.5 to 20 mole percent comonomer. Suitable comonomers include propylene, 1-butene, 1-pentene, 1-hexene and 1-octene.

Another area in which the prior art olefin polymers always represent a compromise in properties is with regard to shear response. For certain applications, a high shear response as evidenced by the ratio of high load melt index to melt index, is desirable. This has heretofore been associated with broad molecular weight distribution as determined by size exclusion chromatography, for instance. The polymers produced by the catalysts of this invention exhibit a high shear response as evidenced by high HLMI/MI ratios indicating relatively broad molecular weight distribution. In this regard, it must be kept in mind that HLMI/MI ratios are meaningful only if compared on a comparable melt index basis. The references herein to melt index (MI) refer to ASTM D1238-65-T, Condition E, and to high load melt index (HLMI) refer to ASTM D1238-65T, Condition F, the difference being 21,600 gram weight in the high load test and 2,160 gram weight in the regular melt index test, the temperature being 190° C. in each instance when the tests are utilized for predominantly ethylene polymers and copolymers. Polymer density in g/cc is determined in accordance with ASTM D 1505-68.

Another instance in which the catalysts of this invention give an effect which is opposite to that obtained with the catalysts of the prior art is in the low terminal vinyl content of the polymer chains which is in the order of about 0.25 vinyl group/1000 carbon atoms, whenever hydrogen is used which is a sign that hydrogenation may be occurring. This is unlike the effect found in polymers either made by conventional chromium oxide on silica catalysts or chromium oxide on phosphate base.

EXAMPLE I

A support containing aluminum phosphate associated with boron phosphate was prepared in an aqueous medium containing orthophosphoric acid by admixing therewith a commercially available compound combining aluminum and boron, $Al(OH)_2OC_2H_5 \cdot \frac{1}{2}H_3BO_3$, and neutralizing with ammonium hydroxide to obtain a precipitate. The precipitate was isolated by filtration and the filter cake washed with water. The product was then subjected to azeotrope distillation with isoamyl alcohol to remove the water and filtered to obtain the support. The support was divided into portions with each portion contacted with a vanadium compound to produce the invention catalysts. Analysis showed the support had a surface area of 117 m$^2$/g and contained 16.2 weight percent aluminum, 1.1 weight percent boron and 28.2 weight percent phosphorus with the remainder comprising combined oxygen. The amount of boron amounted to about 11 atom (mole) percent of the phosphorus. The phosphorus to combined metal (aluminum plus boron) atom ratio in the support was about 1.3:1 and the phosphorus to aluminum atom ratio in the support was about 1.5:1.

Catalyst A was prepared by slurrying 44.4 g of the support (90 percent solids) with 5.5 g of vanadium(III) acetylacetonate in acetone. The solvent was evaporated from the mixture and portions of the product were individually calcined in air for one hour at 500° C. to produce the catalyst. The catalyst was calculated to contain about 1.7 weight percent vanadium in the form of an oxide.

Catalyst B was prepared by slurrying 7.4 g of the above support, previously calcined in air for one hour at 500° C., with 0.28 mL (0.5 g) of vanadyl trichloride in n-heptane. The solvent was evaporated from the mixture and the product calcined in air for one hour at 500° C. to produce the catalyst. The catalyst was calculated to contain about 1.5 weight percent vanadium in the form of an oxide.

Catalyst C was prepared by contacting 2.8 g of calcined catalyst A with 1 mL of 0.75 molar diethylaluminum chloride (DEAC) contained in n-hexane in a n-pentane slurry. The product was filtered, washed twice with n-pentane and the solvent removed by evaporation. The product which was stored under dry nitrogen was not analyzed.

Catalyst D was prepared by contacting 2.0 g of calcined catalyst A with 2 mL of 1.5 molar ethylaluminum dichloride (EADC) contained in n-hexane in a n-heptane slurry. The product was filtered, washed, dried and stored like catalyst C. The catalyst was not analyzed.

EXAMPLE II

Ethylene was polymerized under particle form conditions in a stirred, stainless steel reactor of about 2 L capacity employing about 600 g of isobutane as diluent in each run with a catalyst charge ranging from about 0.03 to about 1.2 g, and in the presence of 1 mL of a hydrocarbon solution of the specified metal alkyl as cocatalyst and in the presence of hydrogen (100 psi, 0.69 MPa), when used. The reactor and its contents were heated to the desired operating temperature (80° C.), ethylene was pressured in to give a total reactor pressure of about 615 psia (4.24 MPa) and the run was started and continued for 1 hour. Ethylene pressure was maintained during the run by supplying additional ethylene as required from a reservoir.

Each run was terminated by stopping ethylene flow and venting the gaseous contents to a flare line for disposal. The polymer was recovered, dried and weighed to determine catalyst productivity which is expressed in terms of grams polyethylene per gram catalyst per hour.

The heterogeneity index (HI) is thought to provide a more acurate representation of polymer molecular weight distribution than the HLMI/MI ratio. HI is determined from the ratio of weight average ($M_w$) to number average ($M_n$) molecular weight values obtained from size exclusion chromatography.

Vinyl groups per 1000 carbon atoms are determined by infrared analysis.

The results are presented in Tables IA and IB. Lack of an entry signifies no determination was made. TEB signifies triethylborane, TIBA signifies triisobutylaluminum, TEA signifies triethylaluminum, EASC signifies ethylaluminum sesquichloride, and EADC signifies ethylaluminum dichloride.

TABLE IA

| | | | | | | | | | | | | |
|---|---|---|---|---|---|---|---|---|---|---|---|---|
| | Ethylene Polymerization, Catalysts Activated In Air | | | | | | | | | | | |
| | Catalyst | | | Cocatalyst | | | Hydrogen | Productivity | HLMI | | | Density |
| Run No. | No. | V Source | Activation Temp. °C. | Name | ppm | g atom Al (B) | Used | g/g hr | MI | MI | HI | g/cc | Remarks |
| 1 | B | VOCl$_3$ | 500 | TEA | 190 | 0.001 | No | 102 | | | | 0.9420 | |
| 2 | A | VOCl$_3$ | 500 | TEA | 190 | 0.001 | No | 20 | | | | | |
| 3 | A | VOCl$_3$ | 500 | TEA | 190 | 0.001 | No | 36 | | | | | |
| 4 | A | VOCl$_3$ | 500 | TEA | 190 | 0.001 | No | 94 | | | | 0.9425 | |
| 5 | A | VOCl$_3$ | 500 | TEA | 95 | 0.0005 | No | 34 | | | | | |
| 6 | C | VOCl$_3$ | 500 | TEA | 190 | 0.001 | No | 416 | | | | 0.9354 | Catalyst pretreated with DEAC |
| 7 | A | VOCl$_3$ | 500 | TIBA | 330 | 0.001 | No | 65 | | | | 0.9431 | |
| 8 | A | VOCl$_3$ | 500 | TEB | 160 | 0.001 | No | Trace | | | | | |
| 9 | A | VOCl$_3$ | 500 | EASC | 275 | 0.00078 | No | 760 | | | | 0.9351 | |
| 10 | A | VOCl$_3$ | 500 | EASC | 275 | 0.00078 | Yes | 360 | 0.75 | 112 | 16 | 0.9712 | 0.25 vinyl groups/ |

TABLE IA-continued

Ethylene Polymerization, Catalysts Activated In Air

| Run No. | Catalyst No. | V Source | Activation Temp. °C. | Cocatalyst Name | ppm | g atom Al (B) | Hydrogen Used | Productivity g/g hr | HLMI MI | MI | HI | Density g/cc | Remarks |
|---|---|---|---|---|---|---|---|---|---|---|---|---|---|
| 11 | A | VOCl$_3$ | 500 | EADC | 287 | 0.0015 | No | 1030 | | | | 0.9332 | 1000 C atoms |
| 12 | A | VOCl$_3$ | 700 | EADC | 287 | 0.0015 | No | 215 | | | | 0.9336 | |

TABLE IB

Ethylene Polymerization, Catalysts Activated In 95/5 Nitrogen/Carbon Monoxide

| Run No. | Catalyst No. | V Source | Activation Temp. °C. | Cocatalyst Name | ppm | g atom Al (B) | Hydrogen Used | Productivity g/g hr | HLMI MI | MI | HI | Density g/cc | Remarks |
|---|---|---|---|---|---|---|---|---|---|---|---|---|---|
| 13 | A | V(AcAc) | 500 | TEA | 190 | 0.001 | No | 54 | | | | | |
| 14 | A | V(AcAc) | 500 | TEA | 190 | 0.001 | No | 130 | | | | 0.9423 | |
| 15 | D | V(AcAc) | 500 | TEA | 190 | 0.001 | No | 390 | | | | 0.9284 | Catalyst pretreated with EADC |
| 16 | A | V(AcAc) | 500 | TEA | 190 | 0.001 | No | 193 | | | | 0.9364 | |
| 17 | A | V(AcAc) | 500 | EADC | 287 | 0.0015 | No | 1385 | | | | 0.9335 | |
| 18 | A | V(AcAc) | 500 | EADC | 287 | 0.0015 | No | 135 | | | | 0.9367 | Low because of contaminated N$_2$ |
| 19 | A | V(AcAc) | 500 | TEB | 160 | 0.001 | No | Trace | | | | | |

Inspection of the data presented in the tables reveals that moderately active ethylene polymerization catalysts are produced whether the catalysts are activated in an oxidizing medium such as air or in a reducing medium such as carbon monoxide. The results suggest that TEB is ineffective as a cocatalyst with the invention catalysts and that organoaluminum compounds, particularly those containing a halogen such as EADC, EASC, and the like, are preferred. Generally, the catalysts, in the absence of hydrogen, produce high molecular weight polymer, too high to give a melt index value (2160 g load) when tested. However, in the presence of hydrogen (run 9), a melt index value of 0.75 was obtained for the polymer showing that the catalysts respond very well to hydrogen. The polymer produced in run 9 also has a high density (0.9712 g/cc) and a broad molecular weight distribution as evidenced by a HI value of 16 and HLMI/MI ratio of 112. The low terminal vinyl content suggests that hydrogenation may be taking place concurrently with polymerization unlike prior art ethylene polymerization catalysts.

While this invention has been described in detail for the purpose of illustration, it is not to be construed as limited thereby but is intended to cover all changes and modifications within the spirit and scope thereof.

We claim:

1. A polymerization process comprising:
   contacting at least one mono-1-olefin having 2 to 8 carbon atoms per molecule in a reaction zone under polymerization conditions with a catalyst system comprising:
   (a) a catalyst comprising an activated vanadium compound on a phosphate-containing support;
   (b) an organoaluminum cocatalyst of the formula $R_nAlX_{3-n}$ wherein R is a 1 to 12 carbon atom alkyl radical, n is a number between 1 and 2 inclusive, and X is a halogen; and
   recovering a polymer.

2. A process according to claim 1 wherein said olefin is selected from ethylene, propylene, 1-butene, 1-pentene, 1-hexene, and 1-octene, and said polymerization is carried out under slurry conditions.

3. A process according to claim 1 wherein said olefin comprises ethylene and said polymerization conditions include a temperature of 205° F.±5° F.

4. A method according to claim 1 wheren said cocatalyst is added to said reaction zone containing said mono-1-olefin as a separate stream from the catalyst.

5. A method according to claim 1 wherein ethylene polymer having 0.4 to 3 weight percent comonomer incorporation is produced by incorporating 0.5 to 20 mole percent comonomer in an ethylene feed.

6. A process according to claim 1 wherein said olefin is ethylene and wherein 0.5 to 20 mole percent of at least one of propylene, 1-butene, 1-pentene, 1-hexene, or 1-octene is in the feed as a comonomer.

7. A process according to claim 1 wherein said cocatalyst is one of diethylaluminum chloride, ethylaluminum dichloride, or ethylaluminum sesquichloride.

8. A process according to claim 1 wherein said cocatalyst is present in an amount sufficient to give an atom ratio of metal of said organometal cocatalyst to vanadium within the range of 2:1 to 75:1.

9. A process according to claim 1 wherein said cocatalyst is present in an amount sufficient to give 50 to 250 parts by weight per million parts by weight of solvent in a polymerization reaction.

10. A process according to claim 1 wherein the vanadium of said vanadium compound is present in an amount within the range of 0.1 to 5 weight percent based on the weight of said phosphate-containing support.

11. A process according to claim 1 wherein said vanadium compound is vanadium acetylacetonate or vanadyl trichloride.

12. A polymerization process comprising:
   contacting at least one mono-1-olefin having 2 to 8 carbon atoms per molecule in a reaction zone under polymerization conditions with a catalyst system produced by a process comprising:
   (a) forming a supported catalyst by
      forming an aluminum phosphate hydrogel,
      converting said hydrogel to a xerogel,
      introducing a vanadium compound by one of coprecipitating with said aluminum phosphate, adding an aqueous solution of a vanadium compound to said hydrogel or adding a non-aqueous solution of a vanadium compound to said xerogel, and activating said xerogel containing said vanadium compound by heating to a temperature of 150°–800° C. to produce said supported catalyst;

(b) combining said supported catalyst with an organoaluminum cocatalyst of the formula $R_nAlX_{3-n}$ wherein R is a 1 to 12 carbon atom alkyl radical, n is a number between 1 and 2 inclusive, and X is a halogen; and recovering a polymer.

13. A method according to claim 12 wherein said aluminum phosphate is produced by combining an aqueous solution containing aluminum and boron ions with a source of phosphate ions and neutralizing.

14. A method according to claim 13 wherein said source of aluminum ions is aluminum nitrate and said source of phosphate ions is phosphoric acid.

15. A method according to claim 12 wherein said aluminum phosphate is produced by combining an aluminum alkoxide with phosphoric acid.

16. A method according to claim 15 wherein said alkoxide is aluminum ethoxide.

17. A method according to claim 12 wherein said aluminum phosphate is produced by combining a source of phosphate ions with a melt of an aluminum salt and neutralizing to give a hydrogel.

18. A method according to claim 17 wherein said aluminum salt is hydrated aluminum nitrate and said source of phosphate ions is phosphoric acid.

19. A method according to claim 12 wherein said activating is carried out in an ambient comprising either air or carbon monoxide.

20. A polymerization process comprising:
contacting at least one mono-1-olefin having 2 to 8 carbon atoms per molecule with the catalyst system prepared by a process comprising:
(a) forming a supported catalyst by treating a silica-containing material with a phosphating agent selected from phosphate ions and vaporized phosphorus compounds so as to give 0.001 to 0.2 gram atoms of phosphorus per mole of silica, incorporating a vanadium compound to produce said supported catalyst, and activating the resulting catalyst at a temperature of 150°–800° C.;
(b) combining said supported catalyst with an organoaluminum cocatalyst of the formula $R_nAlX_{3-n}$ wherein R is a 1 to 12 carbon atom alkyl radical, n is a number between 1 and 2 inclusive, and X is a halogen; and recovering a polymer.

21. A method according to claim 20 wherein said silica is produced by one of spray drying, tray drying, or oven drying and wherein said phosphating agent is phosphoric acid, and wherein said treating is carried out on said silica in the hydrogel stage.

22. A method according to claim 20 wherein said activation is carried out in either air or carbon monoxide.

23. A polymerization process comprising:
contacting at least one mono-1-olefin having 2 to 8 carbon atoms per molecule in a reaction zone under polymerization conditions with a catalyst system produced by a process comprising:
(a) forming a supported catalyst by:

forming a silica/phosphate composition containing a vanadium compound, and
activating said thus-produced vanadium-containing composition by heating at a temperature of 150°–800° C.; and (b) combining said supported catalyst with an organoaluminum cocatalyst of the formula $R_nAlX_{3-n}$ wherein R is a 1 to 12 carbon atom alkyl radical, n is a number between 1 and 2 inclusive, and X is a halogen, and recovering a polymer.

24. A method according to claim 23 wherein said silica/phosphate composition is produced by co-precipitating silica and aluminum phosphate to form a hydrogel, and removing water from said hydrogel to form a xerogel.

25. A method according to claim 23 wherein said hydrogel is formed by contacting tetrahydrocarbyl orthosilicate with an aluminum salt and a phosphoric acid and thereafter neutralizing.

26. A method according to claim 23 wherein said silica/phosphate composition is produced by impregnating a silica hydrogel or xerogel with aluminum phosphate by adding a source of aluminum ions and phosphate ions to a slurry of a silica hydrogel or xerogel in a diluent and thereafter forming said aluminum phosphate by either evaporating off the diluent or adding a base.

27. A method according to claim 26 wherein said silica xerogel is produced by one of spray drying, tray drying, or oven drying, said source of aluminum ions is aluminum salt, said source of phosphate ions is phosphoric acid and said phosphate is produced by evaporating off the solid.

28. A method according to claim 23 wherein said silica/phosphate composition is produced by impregnating a silica xerogel with boron phosphate by adding a source of boron ions and a source of phosphate ions to a slurry of a silica in a diluent and thereafter evaporating off the diluent.

29. A method according to claim 28 wherein said silica is produced by one of tray drying, spray drying, or oven drying, said source of boron ions is boric acid and said source of phosphate ions is phosphoric acid.

30. A method according to claim 23 wherein said silica/phosphate composition is produced by precipitating aluminum phosphate in the presence of a silica hydrogel or xerogel and removing water to convert said hydrogel to a xerogel.

31. A method according to claim 30 wherein sodium silicate is added to an acid to form said silica hydrogel and wherein an aluminum salt and phosphoric acid are added thereto and the resulting mixture neutralized with a base.

32. A method according to claim 23 wherein said silica/phosphate composition is produced by physically mixing a silica xerogel and aluminum phosphate xerogel either prior to said activation or subsequent to said activation.

33. A method according to claim 32 wherein said silica xerogel and aluminum phosphate xerogel are separately activated.

34. A polymerization process comprising:
contacting at least one mono-1-olefin in a reaction zone under polymerization conditions with the catalyst system produced by a process comprising:
(a) forming a supported catalyst by phosphating an aluminacontaining composition by treating same with a phosphating agent selected from (1) phosphate ions, and (2) vaporous phosphorus compounds to give a surface composition having a 0.2:1 to 1.8:1 P/Al atom ratio, said composition having a vanadium compound incorporated therein, activating the thus phosphated alumina composition containing said vanadium compound by heating at a temperature within the range of 150°–800° C.;

(b) combining said supported catalyst with an organometal cocatalyst of the formula $R_nAlX_{3-n}$ wherein R is a 1 to 12 carbon atom slkyl radical, n is a number between 1 and 2 inclusive, and X is a halogen; and recovering a polymer.

35. A method according to claim 34 wherein said alumina is in the hydrogel stage during said phosphating and said phosphating agent is phosphoric acid.

36. A method according to claim 34 wherrein said activation is carried out in air or carbon monoxide.

* * * * *